US012585938B2

(12) United States Patent
Crandall et al.

(10) Patent No.: US 12,585,938 B2
(45) Date of Patent: Mar. 24, 2026

(54) CONSENSUS DRIVEN LEARNING

(71) Applicant: The Government of the United States of America, as represented by the Secretary of the Navy, Arlington, VA (US)

(72) Inventors: Kyle Crandall, Alexandria, VA (US); Dustin Webb, Salt Lake City, UT (US)

(73) Assignee: The Government of the United States of America, as represented by the Secretary of the Navy, Arlington, VA (US)

( * ) Notice: Subject to any disclaimer, the term of this patent is extended or adjusted under 35 U.S.C. 154(b) by 1192 days.

(21) Appl. No.: 17/347,150

(22) Filed: Jun. 14, 2021

(65) Prior Publication Data

US 2021/0390408 A1    Dec. 16, 2021

Related U.S. Application Data

(60) Provisional application No. 63/038,281, filed on Jun. 12, 2020.

(51) Int. Cl.
*G06N 3/08*     (2023.01)
*G06N 3/045*    (2023.01)

(52) U.S. Cl.
CPC .............. *G06N 3/08* (2013.01); *G06N 3/045* (2023.01)

(58) Field of Classification Search
CPC ................................. G06N 3/08; G06N 3/045
See application file for complete search history.

(56) References Cited

U.S. PATENT DOCUMENTS 9,183,347 B1 * 11/2015 Paxson ................... G06F 9/505

OTHER PUBLICATIONS

Tkaczyk, D., Collins, A., Sheridan, P., & Beel, J. (May 2018). Machine learning vs. rules and out-of-the-box vs. retrained: An evaluation of open-source bibliographic reference and citation parsers. In Proceedings of the 18th ACM/IEEE on joint conference on digital libraries (pp. 99-108). (Year: 2018).*
Breuel, T. M. (2015). Benchmarking of LSTM networks. arXiv preprint arXiv:1508.02774. (Year: 2015).*
Wallace, C., Ackels, S., Benavidez, P., & Jamshidi, M. (Jun. 2020). Real-time distributed ensemble learning for fault detection of an unmanned ground vehicle. In 2020 IEEE 15th International Conference of System of Systems Engineering (SoSE) (pp. 463-468). IEEE. (Year: 2020).*

(Continued)

*Primary Examiner* — Kamran Afshar
*Assistant Examiner* — Lokesha Patel
(74) *Attorney, Agent, or Firm* — US Naval Research Laboratory; William P. Ladd

(57)     ABSTRACT

Systems and methods are provided for consensus driven learning (CDL) using machine learning (ML) to enable devices to learn a model on a data set that is distributed over several computational nodes in a decentralized manner. In an embodiment, local models are trained on local data and share model parameters in an asynchronous, decentralized, and distributed manner that imposes minimal restrictions on the topology of a communications network. Systems and methods using CDL in accordance with embodiments of the present disclosure do not require a central server to coordinate models like most conventional technologies, high bandwidth, or highly robust communication architecture between nodes.

20 Claims, 4 Drawing Sheets

(56)     References Cited

OTHER PUBLICATIONS

Pham, H. A., Soriano, T., Ngo, V. H., & Gies, V. (2020). Distributed adaptive neural network control applied to a formation tracking of a group of low-cost underwater drones in hazardous environments. Applied Sciences, 10(5), 1732. (Year: 2020).*

Bonawitz, Keith, Hubert Eichner, Wolfgang Grieskamp, Dzmitry Huba, Alex Ingerman, Vladimir Ivanov, Chloe Kiddon et al. "Towards federated learning at scale: System design." arXiv preprint arXiv:1902. 01046 (Mar. 2019).

Niu, Feng, Benjamin Recht, Christopher Ré, and Stephen J. Wright. "Hogwild!: A lock-free approach to parallelizing stochastic gradient descent." arXiv preprint arXiv:1106.5730 (Jun. 2011).

Noel, Cyprien, and Simon Osindero. "Dogwild!—distributed hogwild for cpu & gpu." In *NIPS Workshop on Distributed Machine Learning and Matrix Computations*, pp. 693-701. (2014).

Sergeev, Alexander, and Mike Del Balso. "Horovod: fast and easy distributed deep learning in TensorFlow." arXiv preprint arXiv:1802. 05799 (Feb. 2018).

* cited by examiner

CONSENSUS DRIVEN LEARNING

CROSS REFERENCE TO RELATED APPLICATIONS

This application claims the benefit of U.S. Provisional Patent Application No. 63/038,281, filed on Jun. 12, 2020, which is incorporated by reference herein in its entirety.

FEDERALLY SPONSORED RESEARCH AND DEVELOPMENT

The United States Government has ownership rights in this invention. Licensing inquiries may be directed to Office of Technology Transfer at US Naval Research Laboratory, Code 1004, Washington, DC 20375, USA; +1.202.767.7230; techtran@nrl.navy.mil, referencing Navy Case Number 113010-US2.

FIELD OF THE DISCLOSURE

This disclosure relates to machine learning, including distributed learning.

BACKGROUND

There are many instances where data is distributed among several nodes, each with their own compute capability, and unique set of data (for example, a team of robots operating in an unknown environment, or edge computing in general). In many of these cases, robust communication is not a guarantee, and reliance on a central server for coordination may not be feasible.

As the complexity of neural network models grows, so too do the data and computation requirements for successful training. One possible solution to this problem is training on a distributed network of computational devices, thus distributing the computational and data storage loads. Existing techniques for distributed learning assume robust, high speed communication between computation nodes or assume that the sheer volume of data makes losses tolerable. Most conventional methods of distributed learning rely on centralized servers for coordination and thus do not distribute coordination. Further, most conventional methods of distributed learning require nodes to perform synchronization steps during the update phase of training. Additionally, existing decentralized methods require extraordinary communications bandwidth and robustness to succeed in a timely fashion.

BRIEF DESCRIPTION OF THE DRAWINGS/FIGURES

The accompanying drawings, which are incorporated in and constitute part of the specification, illustrate embodiments of the disclosure and, together with the general description given above and the detailed descriptions of embodiments given below, serve to explain the principles of the present disclosure. In the drawings.

Figure 1:
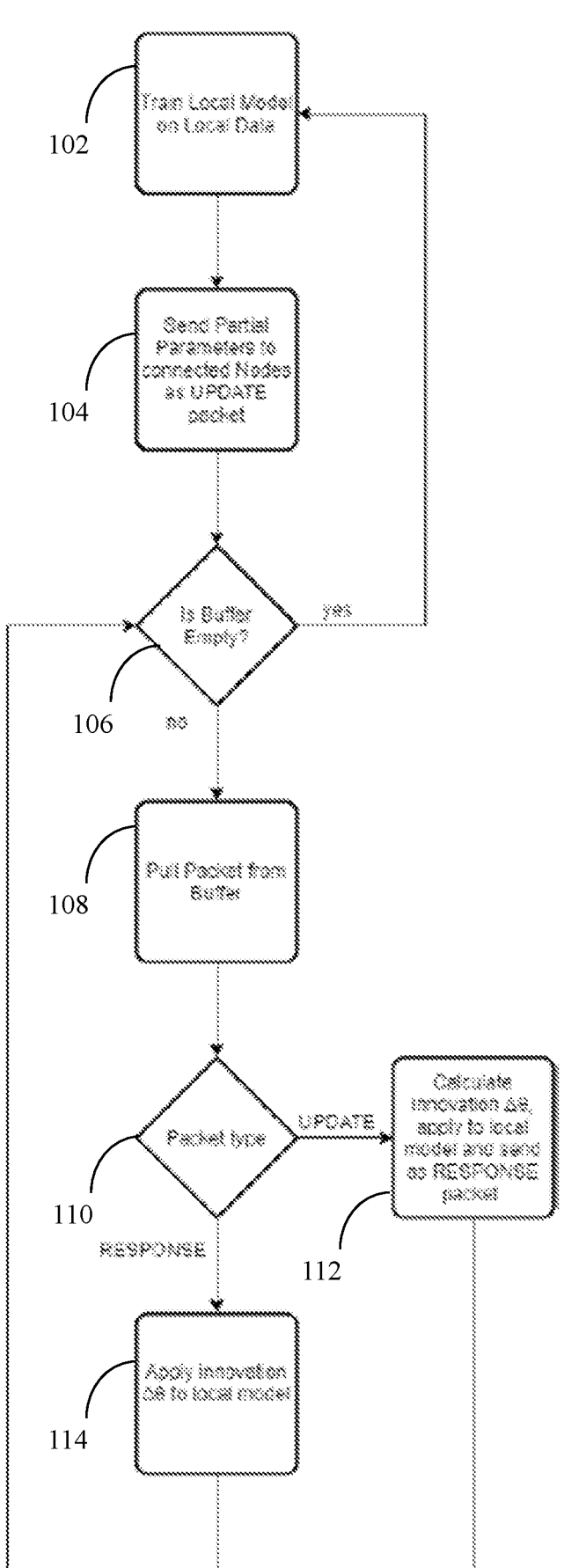
FIG. 1 is a flowchart illustrating an exemplary operation of a node using consensus driven learning (CDL) in accordance with an embodiment of the present disclosure.

Features and advantages of the present disclosure will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

In the following description, numerous specific details are set forth to provide a thorough understanding of the disclosure. However, it will be apparent to those skilled in the art that the disclosure, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to understand that such description(s) can affect such feature, structure, or characteristic in connection with other embodiments whether or not explicitly described.

1. OVERVIEW

Embodiments of the present disclosure provided systems and methods for consensus driven learning (CDL) using machine learning (ML) to enable devices to learn a model on a data set that is distributed over several computational nodes in a decentralized manner. In an embodiment, local models are trained on local data and share model parameters in an asynchronous, decentralized, and distributed manner that imposes minimal restrictions on the topology of a communications network.

In an embodiment, sharing the local model instead of the training data allows the original raw data to remain with the computation node. The asynchronous nature and lack of centralized coordination allows this paradigm to function with limited communication requirements. In an embodiment, this method allows models to be learned on highly biased data sets and in the presence of intermittent communication failure.

Systems and methods using CDL in accordance with embodiments of the present disclosure do not require a central server to coordinate models like most conventional technologies, high bandwidth, or highly robust communication architecture between nodes. Systems and methods using CDL in accordance with embodiments of the present disclosure are useful for coordinating training on distributed data sets (e.g., a team of unmanned platforms where individuals make partial observations of a target). Embodiments of the present disclosure can achieve similar performance to models trained using centralized methods, even if local data is heavily biased.

In an embodiment, because updates can be sent at any time, no strong synchronization is required among all nodes. This allows updates to be asynchronous and for nodes to continue training on local data if they temporarily lose communication. Further, this allows for a lost node to rejoin when contact is re-established.

Embodiments of the present disclosure also do not have strong requirements on the communication network to be in place for stable operation. In an embodiment, communication channels can pop in and out of existence as long as each node is able to talk to at least one other node, and groups of nodes do not remain isolated for extended periods of time. In addition, in an embodiment, the actual training data remains local to each node and is never transmitted, as only the model parameters are transmitted.

Additionally, systems and methods in accordance with embodiments of the present disclosure can rely only on partial updates in an embodiment (e.g., instead of requiring full model updates). By sending partial updates, embodiments of the present disclosure can reduce the amount of bandwidth required to transfer data between nodes.

2. EXEMPLARY OPERATION OF A NODE USING CDL

In an embodiment, a plurality of compute nodes run an algorithm on local data sets. In an embodiment, the algorithms on the compute nodes can be the same algorithm or different algorithms configured for each node. In an embodiment, a CDL system has a training phase and an update phase. In an embodiment, in the training phase, a ML technique (such as stochastic gradient descent), is used to train the node's local model on a local data set. In an embodiment, in the update phase, the model parameters are sent to other nodes, and incoming messages are read and used to update the local model. In an embodiment, a node alternates between these phases during a training epoch.

In an embodiment, the training phase pushes models towards a local minimum, and models move based on local data. In an embodiment, the update phase pushes model towards consensus and can be done asynchronously. In an embodiment, while these phases do not always reinforce each other, together they provide several desirable effects. For example, these phases can pull stray nodes out of suboptimal local minima, and once consensus is achieved, models can advance together as a group.

In an embodiment, each node i includes: (1) a local data set including n labeled data pairs $D_i = \{x_{ij}, y_{ij}\} \forall 0 < j < n\}$; (2) a local model being trained such that $\hat{y} = f(x|\theta)$ minimizes a loss function $l(y, \hat{y})$ by finding an optimal set of parameters $\theta$; and (3) a communications buffer $B_i$ into which other nodes can place data.

FIG. 1 is a flowchart illustrating an exemplary operation of a node using consensus driven learning (CDL) in accordance with an embodiment of the present disclosure. In step 102, a batch of training data is pulled from $D_i$, and the local model is trained on this set using machine learning techniques (such as stochastic gradient descent). In step 104, a random portion of the parameter vector $\theta$ is sent to all connected nodes. In an embodiment, this packet has several components, including: (1) an identifier of node that sent the packet, i; (2) a flag indicating that the packet is an update packet; (3) the seed used by the random number generator to pick which parameters were sent; and (4) the values of the chosen parameters.

In step 106, a determination is made regarding whether the buffer is empty, in which case the method returns to step 102. If the buffer is not empty, the method proceeds to step 108. In step 108, a packet is pulled from the buffer. In an embodiment, for each item in the communications buffer $B_i$, using the random seed in the packet, a mask is generated to select the appropriate set of parameters in the local model. In step 110, a determination is made regarding whether the packet is an update packet or a response packet.

In step 112, if the packet is an update packet, then an innovation $\delta\theta$ is calculated based on the data in the packet and the selected parameters of the local model. In an embodiment, the parameters are then updated by adding $\delta\theta$ to them. In an embodiment, the packet data is overwritten with the values of $\delta\theta$, and the flag is adjusted to identify it as a response packet. In an embodiment, this response packet is then sent back to the node that originally sent it.

In step 114, if the packet is a response packet, then the innovation $\delta\theta$ contained in the packet is subtracted from the appropriate parameters in the local model.

Figure 2:
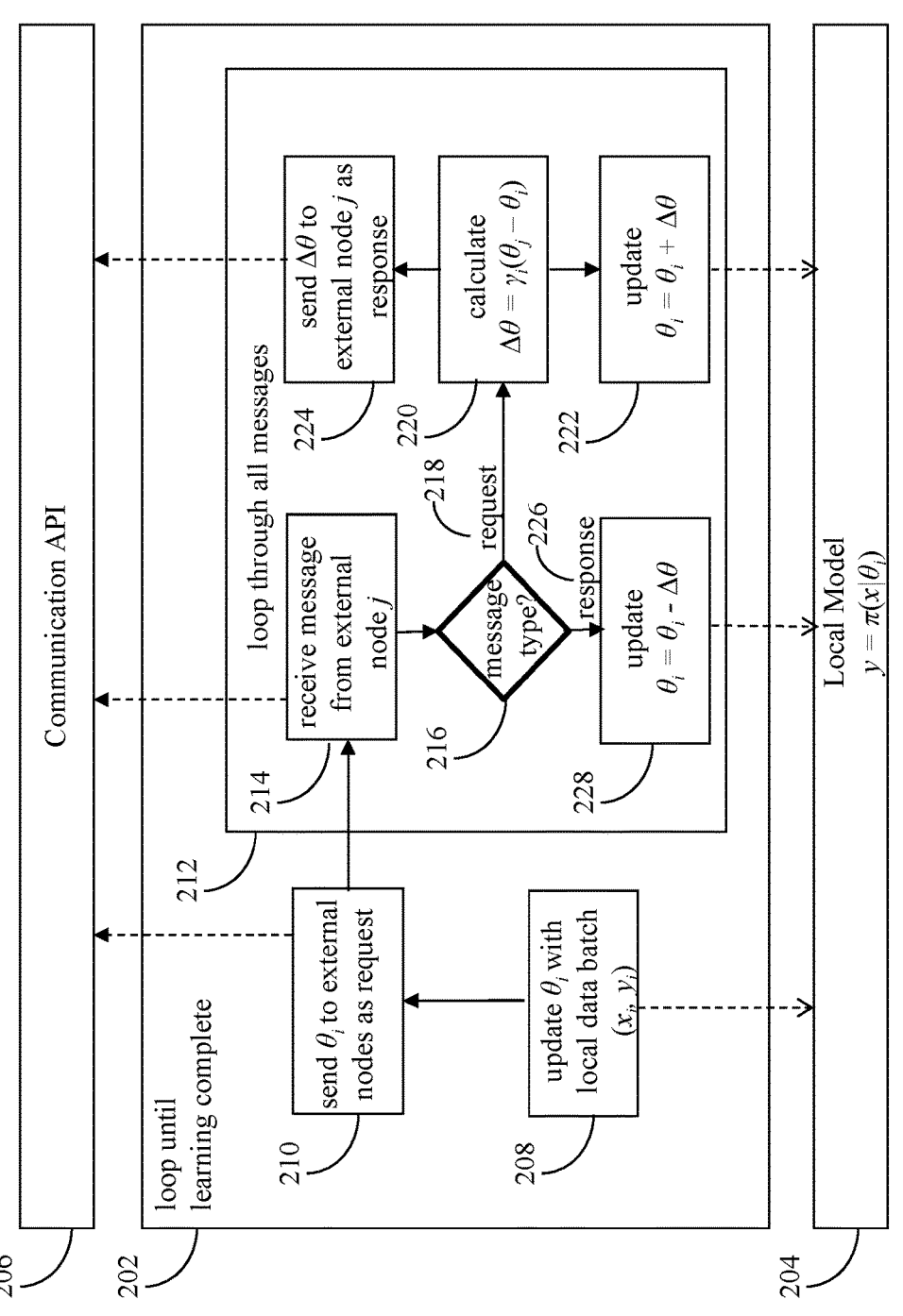
FIG. 2 is another flowchart illustrating an exemplary operation of a node using CDL in accordance with an embodiment of the present disclosure.

FIG. 2 is another flowchart illustrating an exemplary operation of a node using CDL in accordance with an embodiment of the present disclosure. In FIG. 2, loops 202 are performed by each node until learning is complete. Each node trains a local model 204, and a communication application programming interface (API) 206 allows nodes to transmit data to each other. In FIG. 2, dashed lines represent an operation accessing node elements.

In an embodiment, first, each node updates 208 the local model 204 based on ML techniques using local data. In an embodiment, after training on several batches of data, the model parameters are sent 210 to external nodes as request messages using communication API 206. In an embodiment, each node can then loop through messages 212 in its communication buffer.

In an embodiment, first, when a message is received 214 from an external node j, a determination 216 is made regarding the message type (e.g., whether the incoming message is a request message or a response message). In an embodiment, if the incoming message is a request message 218, it contains the model parameters of another node. In an embodiment, in this case, an update is calculated 220 based on the difference between the parameter values. In an embodiment, $\gamma$ is a scaling term (e.g., a number between 0 and 1) that scales how far to move an estimate in each iteration. For example, $\gamma$ can be a user-configured term set based on the application. In an embodiment, this update is added 222 to the parameters in the local model 204 and is sent 224 back to the node that originally made the request as a response message via communication API 206.

In an embodiment, if an incoming message is a response message 226, it contains an update calculated by another node (e.g., the node that sent the message). In an embodiment, this update is then subtracted 228 from the parameters of local model 204. A network of nodes operating in this manner is able to coordinate their learning by maintaining a consensus among themselves of the parameters of the model being learned.

In an embodiment, returning the update to the initial sender is not strictly necessary. In an embodiment, compute nodes can exist on the same computer or across several networked computers, and the only requirement is that they can communicate with each other. Embodiments of the present disclosure are also agnostic to the communication API being used and could conceivable be used to train other machine learning models beyond just neural networks.

3. EXEMPLARY CDL ALGORITHMS

In an embodiment, CDL algorithms run on a network of compute nodes with some ability to communicate with each other. In an embodiment, each compute node uses a standard training method with local data to train and a consensus algorithm to coordinate the training across the full network. In an embodiment, incoming updates are are stored in a buffer, and local updates to the values are performed using training methodology.

In an embodiment, an exemplary CDL algorithm assumes a ML problem set up as follows: (1) a model $y=\phi(x|p)$ where y are the labels, x are the inputs, and p are the parameters; (2) a loss function $\lambda=L(x,y)$; (3) a training function $p_{k+1}=\text{trainOnBatch}(p_k, x, y)$; (4) a training data set with a function that returns a batch of data to train on x, $y=\text{getBatch}(\ )$, and (5) the parameters p are initialized to some value pro. This value can be different for each node.

In an embodiment, a communications structure facilitates the sending of messages between nodes. In an embodiment, we assume this structure has the following capabilities for a given node i: (1) $C_{it}$, a set of all nodes to whom a communication channel exists at time t; (2) $U_i$, an input First In, First Out Buffer (FIFO Buffer); (3) sendTo (m, j), a function that will place message m into $U_j$ if $j \in C_{it}$; and (4) m, $j=\text{recvNext}(U_i)$, a function to retrieve the next message in $U_i$ and its source node, which returns ø; if $U_i=\text{ø}$.

Figure 3:
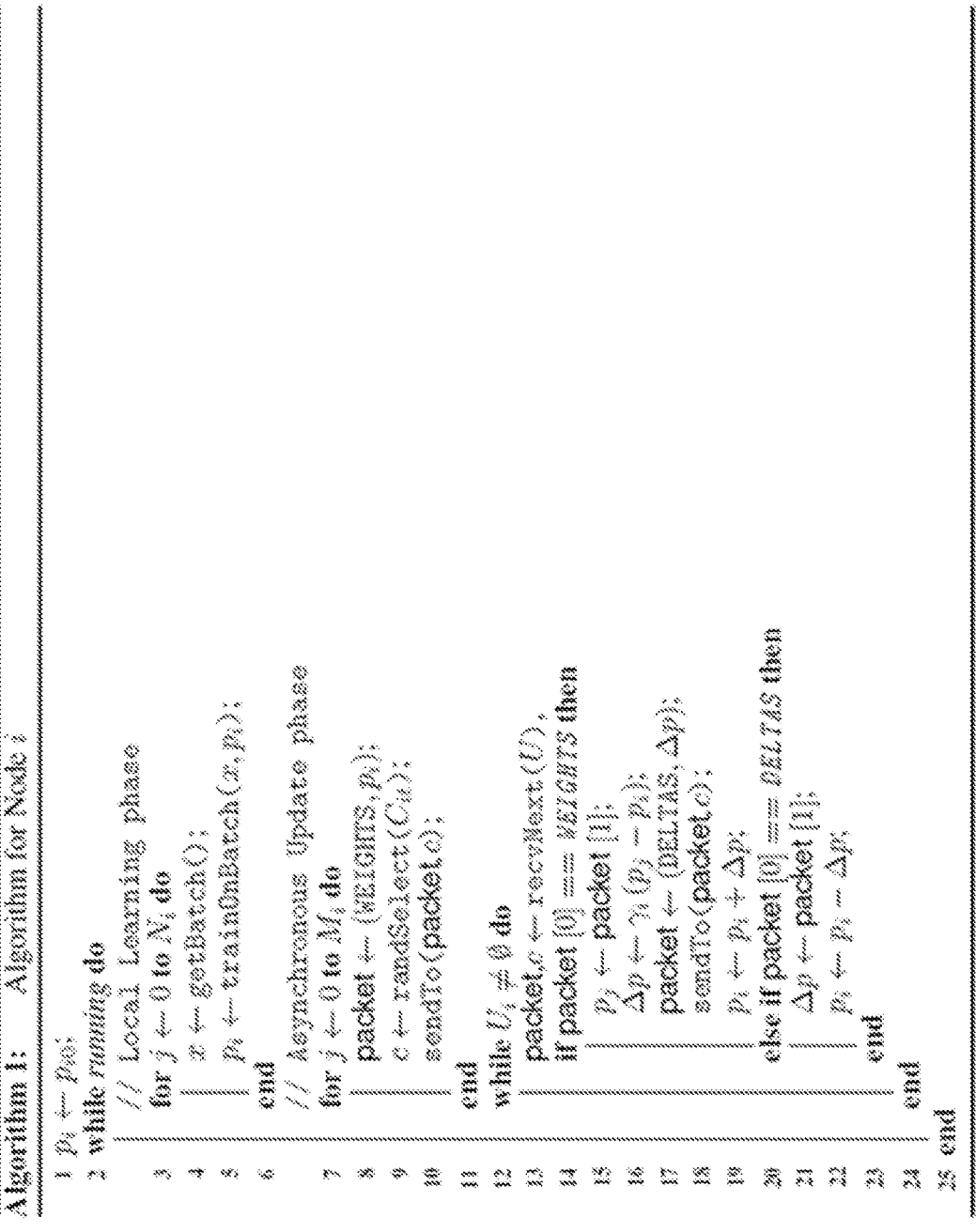
FIG. 3 shows an exemplary pseudo code CDL algorithm in accordance with an embodiment of the present disclosure.

In an embodiment, there are two types of messages being sent between nodes. In an embodiment, to signal the type of data a message contains, it is prepended with either a WEIGHTS or DELTAS flag. In an embodiment, because the CDL algorithm uses two different types of messages, each message has a flag at the beginning to specify the type. For example, in an embodiment, a STATE flag signals the message contains the current estimate of the averages, and an UPDATE flag that indicates the message contains an update to be applied to an internal state. In an embodiment, a CDL algorithm is broken into two distinct phases, the local learning phase, where the node's internal model is updated based on local training data and the asynchronous update phase, where the nodes update each other to reach towards a consensus on the model. In an embodiment, the local learning phase performs localized training on N, batches of data and then move on to the asynchronous update phase. In an embodiment, this phase starts by sending the node's current weights to $M_i$ random nodes in $C_{it}$. In an embodiment, the node can process all the messages in its communication buffer $U_i$, and then return to the local learning phase. In an embodiment, each node alternates through these different phases until the learning task is deemed complete. FIG. 3 shows an exemplary pseudo code CDL algorithm in accordance with an embodiment of the present disclosure.

4. EXEMPLARY CDL SYSTEM

Figure 4:
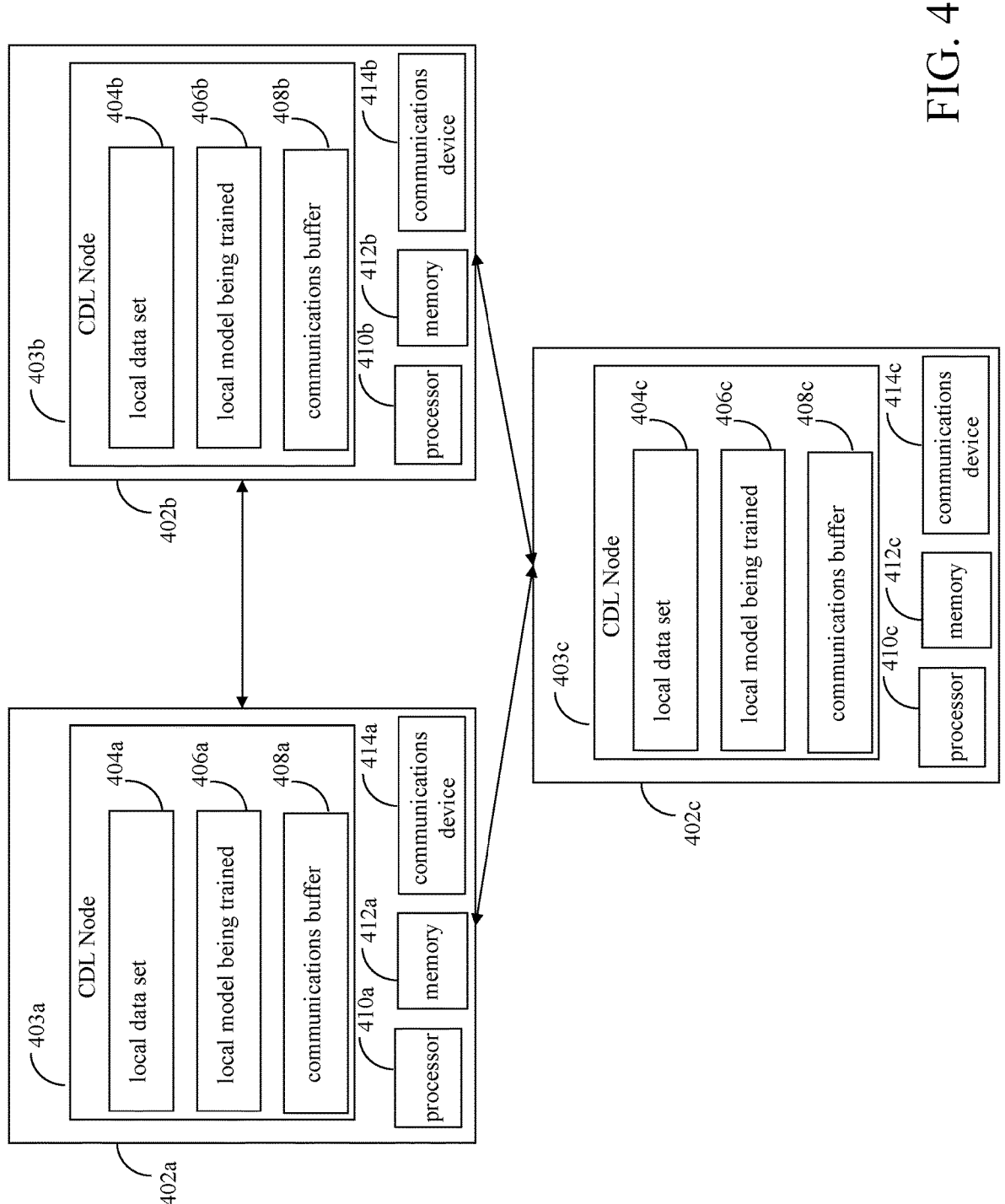
FIG. 4 shows a diagram of an exemplary CDL system in accordance with an embodiment of the present disclosure.

FIG. 4 shows a diagram of an exemplary CDL system in accordance with an embodiment of the present disclosure. FIG. 4 shows 3 devices 402 (which can function as CDL nodes) that use CDL to learn a model on a data set that is distributed over several computational nodes in a decentralized manner. While 3 devices are shown in FIG. 4, it should be understood that any number of devices can be used in a CDL system in accordance with embodiments of the present disclosure. Devices 402 can communicate with each other via respective communications devices 414 and communications buffers 408.

As shown in FIG. 4, in an embodiment, each device 402 includes a CDL node 403a, which includes a local data set 404, a local model being trained 406, a communications buffer 408. In FIG. 4, in an embodiment, each device 402 also includes a processor 410, a memory 412, and a communications device 414. For example, in an embodiment, communications device 414 can be a transceiver used to communicate with other devices, which can store received data in respective communications buffers 408.

In an embodiment, CDL nodes 403 are configured to perform CDL methods (e.g., the methods of FIGS. 1 and 2.) For example, in an embodiment, CDL nodes 403 include software configured to perform CDL methods (e.g., the methods of FIGS. 1 and 2.) In an embodiment, CDL nodes include hardware and/or a combination of hardware and software configured to perform CDL methods (e.g., the methods of FIGS. 1 and 2.)

For example, in an embodiment, each device 402 can be a device configured to gather data from the surrounding environment (e.g., an ocean buoy, a device installed on an ocean floor, an unmanned underwater vehicle, an unmanned aerial vehicle, etc.) In an embodiment, each device 402 is installed in a separate location but is configured to measure related data. Using the CDL methods described above, each device 402 can generate a local model and can send updates to the other devices as it gathers data. Using these updates, each device can update its local model as described above, and devices 402 can come to a consensus regarding the data being measured (e.g., atmospheric data, sediment data, wind data, water flow data, etc.)

For example, in an embodiment, devices 403a, 403b, and 403c are unmanned underwater vehicles (UUVs) configured to measure oceanographic data. Using CDL methods described above, devices 403a, 403b, and 403c can train respective local models 406a, 406b, and 406c and can send updates to (and receive updates from) each other to obtain more accurate data using distributed learning.

Devices 403 can be a plurality of copies of the same device or different devices in accordance with embodiments of the present disclosure. For example, in an embodiment, device 403a is a UUV configured to measure oceanographic data, device 403b is a device mounted on an underwater platform configured to measure oceanographic data, and device 403c is a device mounted on a ship configured to measure oceanographic data. Using CDL methods described above, devices 403a, 403b, and 403c can train respective local models 406a, 406b, and 406c and can send updates to (and receive updates from) each other to obtain more accurate data using distributed learning.

Devices 402 can implement CDL methods using software, hardware, and/or a combination of hardware and software. For example, in an embodiment, CDL nodes 403 can be implemented using software, hardware, and/or a combination of hardware and software. Further, in an embodiment, CDL nodes 403 can be integrated using a single device or multiple devices. In an embodiment, each CDL device 402 can be implemented as a standalone, special purpose device. In an embodiment, each CDL node 403 can be implemented as a standalone, special purpose device. In an embodiment, each CDL device 402 can be a device that is integrated into a host device (e.g., a host platform for gathering data from the surrounding environment). In an embodiment, each CDL node 403 can be a device that is integrated into a host device (e.g., a host platform for gathering data from the surrounding environment).

5. PARTIAL UPDATES

In an embodiment, local models 406 include neural networks that can contain a very large number of parameters (e.g., 1000+ parameters). Thus, in an embodiment, sending and receiving updates using these parameters can involve a very large amount of data. In an embodiment, whenever a device (e.g., device 403*a*) sends an update, it can send information regarding its entire local model (e.g., local model 406*a*).

In an embodiment, whenever a device (e.g., device 403*a*) sends an update, it can send a partial update instead of sending a full update containing information from its local model (e.g., local model 406*a*). For example, in an embodiment, device 403*a* can be configured to send only a portion of its parameters as an update. In an embodiment, whenever a device (e.g., device 403*a*) sends another update, it can send another portion of its parameters as a second update. In an embodiment, a device (e.g., device 403*a*) can be configured to select different parameters in each update until all the parameters in its local model (e.g., local model 406*a*) have been sent.

In an embodiment, the parameters to be sent in a partial update can be selected randomly. In an embodiment, the parameters to be sent in a partial update can be selected by a user. In an embodiment, the parameters to be sent in a partial update can be selected based on a request from another device (e.g., device 403*b* or 403*c* can request updates for certain parameters from device 403*a*). In an embodiment, the parameters to be sent in a partial update can be selected based on a designation of importance for each parameter. For example, in an embodiment, parameters can be ranked in importance by a user and/or by a program that is configured to determine the importance of parameters (e.g., based on statistical significance or other metrics) as respective local models are being trained.

In an embodiment, the size of the update in a partial update (e.g., the file size, the percentage of the local model, and/or the number of parameters to be sent) can be configured by a user (e.g., based on a preconfigured and/or configurable setting). In an embodiment, the size of the update in a partial update can be determined based on the bandwidth available to a sending or receiving device.

In an embodiment, the local model (e.g., local model 406*a*) of a device (e.g., device 403*a*) can have a neural network, and the neural network can contain a plurality of layers of neurons. In an embodiment, a portion of the neurons of the neural network can be selected to be sent with a partial update, and a device (e.g., device 403*a*) can be configured to create a sub neural network using this portion of the neurons. In an embodiment, the device (e.g., device 403*a*) can then send this sub neural network as a partial update. In an embodiment, the device (e.g., device 403*a*) can select a different set of neurons for a subsequent partial update, can create a different sub neural network, and can send this different sub neural network in the next partial update. In an embodiment, for each subsequent partial update, respective different sets of neurons can be selected until the entire neural network of the device (e.g., device 403*a*) has been sent via partial updates, thus exploiting ensemble effects.

In an embodiment, the neurons to be sent in a partial update can be selected randomly. In an embodiment, the neurons to be sent in a partial update can be selected by a user. In an embodiment, the neurons to be sent in a partial update can be selected based on a request from another device (e.g., device 403*b* or 403*c* can request updates for certain parameters from device 403*a*, and device 403*a* can select respective neurons corresponding to these parameters to build a sub neural network for a partial update). In an embodiment, the neurons to be sent in a partial update can be selected based on a designation of importance for each neuron. For example, in an embodiment, parameters corresponding to neurons can be ranked in importance by a user and/or by a program that is configured to determine the importance of parameters (e.g., based on statistical significance or other metrics) as respective local models are being trained.

6. CONCLUSION

It is to be appreciated that the Detailed Description, and not the Abstract, is intended to be used to interpret the claims. The Abstract may set forth one or more but not all exemplary embodiments of the present disclosure as contemplated by the inventor(s), and thus, is not intended to limit the present disclosure and the appended claims in any way.

The present disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

Any representative signal processing functions described herein can be implemented using computer processors, computer logic, application specific integrated circuits (ASIC), digital signal processors, etc., as will be understood by those skilled in the art based on the discussion given herein. Accordingly, any processor that performs the signal processing functions described herein is within the scope and spirit of the present disclosure.

The above systems and methods may be implemented using a computer program executing on a machine, using a computer program product, or using a tangible and/or non-transitory computer-readable medium having stored instructions. For example, the functions described herein could be embodied by computer program instructions that are executed by a computer processor or any one of the hardware devices listed above. The computer program instructions cause the processor to perform the signal processing functions described herein. The computer program instructions (e.g., software) can be stored in a tangible non-transitory computer usable medium, computer program medium, or any storage medium that can be accessed by a computer or processor. Such media include a memory device such as a RAM or ROM, or other type of computer storage medium such as a computer disk or CD ROM. Accordingly, any tangible non-transitory computer storage medium having computer program code that cause a processor to perform the signal processing functions described herein are within the scope and spirit of the present disclosure.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments.

What is claimed is:

1. An unmanned platform device for gathering oceanographic data, the unmanned platform comprising:
   a consensus driven learning (CDL) device, wherein the CDL device is configured to:
      cause a processor to perform operations corresponding to a training phase, wherein the operations comprise:
      gathering the oceanographic data in a surrounding environment of the unmanned platform device, thereby generating a first observation of the surrounding environment, and
      training a local model using a local data set and a machine learning technique, wherein the local model includes a plurality of parameters, and wherein the local data set includes the first observation; and
      cause the processor to perform operations corresponding to an update phase, wherein the operations comprise:
      selecting a first portion of the plurality of parameters to be sent in a first partial update,
      selecting respective subsequent portions of parameters in the plurality of parameters to be sent in respective subsequent partial updates until all parameters in the plurality of parameters have been sent in the respective subsequent partial updates,
      generating a consensus for the oceanographic data based on the local model and input received from a second device in communication with the unmanned platform, wherein the input includes a second observation generated by the second device based on second oceanographic data in the surrounding environment; and
   a transceiver device configured to:
      send the first portion of the plurality of parameters in the first partial update to the second device,
      send the respective subsequent portions of parameters in the respective subsequent partial updates to the second device, wherein the first partial update and the respective subsequent partial updates are sent asynchronously, and
      receive the input from the second device, wherein the CDL device is further configured to cause the processor to perform operations comprising:
         pulling a packet of data from a communications buffer, and in response to a determination that the packet is an update packet:
   calculating a first quantity based on the packet and respective parameters of the local model corresponding to the packet, and
   updating the parameters of the local model based on the first quantity.

2. The unmanned platform of claim 1, wherein the CDL device is further configured to cause the processor to perform operations comprising:
   determining whether the communications buffer of the CDL device is empty;
   in response to a determination that the communications buffer of the CDL device is not empty, pulling the packet of data from the communications buffer; and
   determining a type of the packet.

3. The unmanned platform of claim 2, wherein the CDL device is further configured to cause the processor to perform operations comprising:
   updating the parameters by adding the first quantity to the parameters of the local model.

4. The unmanned platform of claim 2, wherein the CDL device is further configured to cause the processor to perform operations comprising:
   in response to a determination that the packet is a response packet:
      determining a second quantity in the response packet, and
      subtracting the second quantity from the parameters of the local model.

5. The unmanned platform of claim 1, wherein respective parameters in the first portion of the plurality of parameters are selected randomly.

6. The unmanned platform of claim 1, wherein the unmanned platform is a first unmanned underwater vehicle (UUV), and wherein the second device is a second UUV.

7. A system, comprising:
   an unmanned platform device for gathering oceanographic data, the unmanned platform configured to cause a processor to perform operations comprising:
      gathering the oceanographic data in a surrounding environment of the unmanned platform device, thereby generating a first observation of the surrounding environment;
      training a first local model using a local data set including the first observation and a machine learning technique, wherein the first local model includes a neural network containing a plurality of neurons,
      selecting a first portion of the plurality of neurons to be sent in a first partial update,
      creating a first neural sub network using the first portion of the plurality of neurons, and
      sending the first neural sub network in the first partial update, wherein the first partial update is sent asynchronously with respect to subsequent partial updates; and
   a second device in communication with the unmanned platform, wherein the second device is configured to cause the processor to perform operations comprising:
      receiving the first partial update,
      calculating a first quantity based on the first partial update and respective parameters of a second local model in the second device that correspond to the first partial update, wherein the second local model includes a second observation of the oceanographic data in the surrounding environment, updating the parameters of the second local model based on the first quantity, thereby generating an updated second local model, and generating a consensus for the oceanographic data based on the updated second local model.

8. The system of claim 7, wherein the unmanned platform is further configured to cause the processor to perform operations comprising:

selecting respective subsequent portions of neurons in the plurality of neurons to be sent in respective subsequent partial updates until all neurons in the plurality of neurons have been sent in the respective subsequent partial updates;

creating respective subsequent neural sub networks using the respective portions of neurons in the plurality of neurons to be sent in the respective subsequent partial updates until all neurons in the plurality of neurons have been sent in the respective subsequent partial updates; and sending the respective subsequent neural sub networks in the respective subsequent partial updates to the second device.

9. The system of claim 7, wherein the unmanned platform is a first unmanned underwater vehicle (UUV), and wherein the second device is a second UUV.

10. A method, comprising:

gathering, using a first unmanned platform device for gathering oceanographic data, the oceanographic data in a surrounding environment of the unmanned platform device, thereby generating a first observation of the surrounding environment;

training, using the first unmanned platform device, a local model of the first unmanned platform device using a local data set including the first observation and a machine learning technique;

selecting, using the first unmanned platform device, a first portion of the local model to be sent in a first partial update;

selecting, using the first unmanned platform device, respective subsequent portions of the local model to be sent in respective subsequent partial updates until all portions of the local model have been sent in the respective subsequent partial updates, wherein the first partial update and the subsequent partial updates are sent asynchronously;

sending, using a transceiver device of the first unmanned platform device, the first portion of the plurality of parameters in the first partial update to a second device in communication with the first device;

sending, from the transceiver device, the respective subsequent portions of parameters in the respective subsequent partial updates to the second device;

receiving, from the transceiver device, input from a second device in communication with the unmanned platform device, wherein the input includes a second observation generated by the second device of the oceanographic data in the surrounding environment;

generating, using the first unmanned platform device, a consensus for the oceanographic data based on the local model and the input received from the second device;

pulling, using the first unmanned platform device, a packet of data from a communications buffer; and in response to a determination that the packet is an update packet:

calculating, using the first unmanned platform device, a first quantity based on the packet and respective parameters of the local model corresponding to the packet, and updating, using the first unmanned platform device, the parameters of the local model based on the first quantity.

11. The method of claim 10, wherein the machine learning technique is a stochastic gradient descent technique.

12. The method of claim 10, further comprising:

determining a type of the packet.

13. The method of claim 12, wherein updating the parameters of the local model comprises adding the first quantity to the parameters of the local model.

14. The method of claim 12, further comprising:

in response to a determination that the packet is a response packet:

determining a second quantity in the response packet, and subtracting the second quantity from the parameters of the local model.

15. The method of claim 10, wherein the first portion of the local model is selected randomly.

16. The method of claim 10, wherein the first portion of the local model comprises a plurality of parameters of the local model.

17. The method of claim 10, wherein the first portion of the local model comprises a plurality of neurons of a neural network of the local model.

18. The unmanned platform of claim 1, wherein the unmanned platform device is an ocean buoy.

19. The unmanned platform of claim 1, wherein the unmanned platform device is a device installed on an ocean floor.

20. The unmanned platform of claim 1, wherein the unmanned platform device is an unmanned aerial vehicle.

* * * * *